United States Patent
Nemethova et al.

(10) Patent No.: US 7,489,941 B2
(45) Date of Patent: Feb. 10, 2009

(54) METHOD FOR CONTROL OF THE TRANSMISSION POWER OF A TRANSMITTING STATION IN A RADIO COMMUNICATION SYSTEM, TRANSMITTING STATION, RECEIVING STATION AND RADIO COMMUNICATION SYSTEM

(75) Inventors: Olivia Nemethova, Bratislava (SK); Peter Slanina, Judenau (AT); Thomas Stadler, Vienna (AT); Burghard Unteregger, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 450 days.

(21) Appl. No.: 10/556,533

(22) PCT Filed: Mar. 8, 2004

(86) PCT No.: PCT/EP2004/002359

§ 371 (c)(1),
(2), (4) Date: Nov. 14, 2005

(87) PCT Pub. No.: WO2004/100393

PCT Pub. Date: Nov. 18, 2004

(65) Prior Publication Data

US 2007/0015528 A1    Jan. 18, 2007

(30) Foreign Application Priority Data

May 12, 2003    (DE)    ................. 103 21 207

(51) Int. Cl.
*H04B 7/00*    (2006.01)
(52) U.S. Cl. ........................ 455/522; 455/69

(58) Field of Classification Search ................. 455/295, 455/522, 67.13, 69; 370/222, 266, 335
See application file for complete search history.

(56) References Cited

U.S. PATENT DOCUMENTS

| 2002/0049068 | A1 | 4/2002 | Koo et al. |
| 2002/0163923 | A1* | 11/2002 | Cox et al. ................. 370/412 |
| 2004/0170192 | A1 | 9/2004 | Hermann |

FOREIGN PATENT DOCUMENTS

| DE | 101 42 123 | 3/2003 |
| EP | 1 067 706 | 1/2001 |
| WO | 01/78291 | 10/2001 |

OTHER PUBLICATIONS

Baker M P et al.: "Power Control In UMTS Release '99" International Conference on 3G Mobile Communication Technologies, XX, XX Nr. 471, 1999, pp. 36-40, Xp000900538, pp. 36-37, line 9.

(Continued)

*Primary Examiner*—Sam Bhattacharya
(74) *Attorney, Agent, or Firm*—Staas & Halsey LLP

(57) ABSTRACT

A method for control of the transmission power of a transmitting station in a radio communication system, whereby a receiving station receives data packets from the transmitting station, the receiving station receives anew incorrect received data packets from the transmitting station and the transmission power of the transmitting station is controlled depending on a repetition rate of the data packets received anew by the receiving station.

23 Claims, 5 Drawing Sheets

OTHER PUBLICATIONS

Kumar P S et al.: "Power Control Based On Bit Error Rate (BER) Measurements" Proceedings of the Military Communications Conference (MILCOM). San Diego, Nov. 6-8m, 1995, New York, IEEE, US, Bd. 1,6. November 1995, pp. 617-622, XP000580896, ISBN: 0-7803-2490-0, p. 617.

3GPP TR 25.896 V0.2.0 (Feb. 2003, $3^{rd}$ Generation Partnership Project; Technical Specification Group Radio Access Network; Feasibility Study for Enhanced uplink for UTRA FDD; (Release 6).

* cited by examiner

METHOD FOR CONTROL OF THE TRANSMISSION POWER OF A TRANSMITTING STATION IN A RADIO COMMUNICATION SYSTEM, TRANSMITTING STATION, RECEIVING STATION AND RADIO COMMUNICATION SYSTEM

CROSS REFERENCE TO RELATED APPLICATIONS

This application is based on and hereby claims priority to Application No. PCT/EP2004/002359 filed on Mar. 8, 2004 and German Application No. 10321207.8 filed on May 12, 2003, the contents of which are hereby incorporated by reference.

BACKGROUND OF THE INVENTION

The invention relates to a method for the control of the transmission power of a transmitting station in a radio communication system as well as a corresponding transmitting station, a corresponding receiving station and a corresponding radio communication system.

In order to allow an error-free transmission of data for all the data packets to be transmitted in radio communication systems, which are operated for example in accordance with the UMTS standard (UMTS: Universal Mobile Telecommunication System), a method is used whereby a receiving station receives incorrectly received data packets once again. This method is known is known as "Automatic Repeat Request" (ARQ).

If a receiving station, for example a base station, receives an incorrect data packet, i.e. the data packet cannot be decoded correctly, it sends a NACK signal (NACK: Not ACKnowledgement) to a transmitting station, for example, to a subscriber station in order to signal the incorrect reception of a data packet. As a result, the subscriber station transmits the corresponding data packet anew to the base station. The base station sends an ACK signal (ACK: ACKnowledgement) to signal the correct (error-free) reception of a data packet.

If the subscriber station changes to another radio cell, it arrives within the transmitting range and the range of reception of at least one additional base station. In the case of a so-called soft handover, the subscriber station at the same time transmits data packets to the base station of the original cell and to at least one other base station of the new cell. All the data packets received by the base stations are forwarded to a Radio Network Controller [RNC] and evaluated there. In the radio network controller, data packets which have been received correctly, are merged and arranged in the correct order and the same data packets are combined.

The subscriber station receives ACK and NACK signals during a soft handover from at least two of the base stations. A sufficient criterion for transmitting a new data packet is that the subscriber station receives an ACK signal from one of the base stations because for an efficient transmission of data, a data packet needs to be forwarded once error-free to the radio network controller.

In order to guarantee a desired quality of the transmission of data of the subscriber station, an error bit rate (BER: Bit Error Rate or BLER: Block Error Rate) is determined in the radio network controller based on all the received data packets and the error rate is compared with a target value. Depending on the result of this comparison, a target value for a receive quality, for example, a signal-to-interference ratio (SIR: Signal-to-Interference Ratio) is specified for the base stations. On the other hand, the base stations in each case measure a receive quality of the signals received by the subscriber station based on the known control signals (pilot symbols) of the subscriber station and compare the specific measured value with the target value for the receive quality specified by the radio network controller. Depending on the result of the comparison, a signal is sent to the subscriber station to either increase or reduce its transmission power. Signals with a size of 1 bit, so-called TPC bits (TPC: Transmit Power Control) are usually used for this purpose. If the subscriber station receives at least one TPC bit from one of the base stations, which requests a reduction, it will reduce its transmission power in order to generate as few interferences as possible in all the receiving base stations. The regulation of the target value for the receive quality by the radio network controller is called the outer loop power control, while the comparatively fast regulation of the transmission power of the subscriber station is designated by the control signals (pilot symbols) of the base stations as the inner loop power control.

Within the framework of the current standardization projects of the 3GPP (3rd Generation Partnership Project), proposals are being discussed at present to also shift the outer loop power control to the base stations. This is advantageous for a transmission of data with a high data rate designated as the "enhanced uplink" (for this purpose, see 3GPP TR25.896v0.2.0) from a subscriber station to a base station, i.e. the uplink.

In addition, data packets are forwarded in the case of an "enhanced uplink" to the radio network controller and joined there. Redundant data packets are likewise also combined in the radio network controller, which specifies a common error rate, namely, the so-called "active set" to all the receiving base stations. The measurement of the actual error rate and the comparison with the target value for the error rate as well as modifications of the target value for the receive quality are now carried by the base stations themselves.

The target value for the error rate is usually very low (approximately $10^{-6}$), so that a measurement of the error rate requires a measuring period of such a length that even slow changes of the transmission conditions can no longer be measured. The target value for the receive quality must therefore be set in such a way that even in the case of poor and rapidly changing transmission conditions, the desired error rate is reached in the radio network controller.

However, if a plurality of base stations now, in the soft-handover, forward at the same time their received data packets to the radio network controller, it is in this way obtained from the above-described setting of the target value for the receive quality that in the radio network controller there is actually a lower error rate than was specified by the target value for the error rate. This is achieved in that, the error rate in the radio network controller is determined by the data packets forwarded from all the base stations and as a result, it is better than from one base station alone. Therefore, the transmission power of the subscriber station is higher than would actually be required and therefore there are more interferences from the data packets transmitted by the subscriber station than would be necessary in a data transmission corresponding with the actual requirements for the error rate.

From EP 1067706 A1, a method for setting a target value for a receive quality is known in which the target value changes depending on a comparison of an averaged frame error rate with a target value of the frame error rate and a comparison of an averaged receive quality with the target value for the receive quality. In addition, it is also known in the case of packet data services to use a plurality of transmission repetitions for packet data units (PDU) instead of the frame error rate.

SUMMARY OF THE INVENTION

One Possible object of the invention is to create an advantageous method for the control of the transmission power of transmitting stations in a radio communication system.

The inventors propose a method for the control of the transmission power of a transmitting station in a radio communication system, a receiving station receives data packets from the transmitting station, the receiving station receives anew incorrectly received data packets from the transmitting station and the transmission power of the transmitting station is controlled depending on a repetition rate of the data packets received anew by the receiving station. A control of the transmission power, which takes into account the repetition rate of the data packets received anew, has the advantage that even in the case of a reception of the data packets by a plurality of receiving stations, the receiving stations all take into account the same value, namely the repetition rate, for the control of the transmission power. The transmitting station transmits its data packets to all the receiving stations, so that all the receiving stations receive anew the same data packets, i.e. take into account the same repetition rate. Therefore, the control of the transmission power takes place in such a way that an overall transmission quality can be taken into account by the repetition rate. That is why the transmission power of the transmitting station can on average be set lower than in a transmission power regulation, which instead of the repetition rate in each case, for example, takes into account a block error rate in the receiving stations. The same also applies in the case of a transmission of data to only a single receiving station. The transmission power of the transmitting station can be reduced if the repetition rate is lower than a corresponding target value, even if a regulation, which takes into account a block error rate, requests an increase.

In an advantageous manner, data packets received for the first time are provided with an identification, which identifies the data packets as being received for the first time. In this way, data packets transmitted or received for the first time can be distinguished from data packets transmitted or received anew. An identification used by the transmitting station to identify data packets transmitted from it for the first time, is as a matter of course, from the viewpoint of the receiving station, an identification, which identifies the data packet as being received for the first time.

In an embodiment, a provisional control signal for the control of the transmission power of the transmitting station is generated in the receiving station whereby the provisional control signal depends on the deviation for a receive quality of the data packets from a target value for the receive quality and a final control signal is generated depending on the repetition rate of the data packets received anew by the receiving station. The provisional control signal corresponds to the previously used control signals of a known transmission power control with inner loop power control and outer loop power control. Because of the final control signal, the transmission power of the transmitting station can on average be lower than when only the provisional control signal is taken into account, because when the repetition rate falls below its target value, the transmission power can be reduced by a corresponding final control signal even if the provisional control signal requests the opposite.

In an alternate embodiment, the repetition rate is determined in the transmitting station.

It is advantageous for this alternate embodiment when the transmitting station receives a control signal from the receiving station for controlling the transmission power, and the transmitting station, by comparing the repetition rate with a target value of the repetition rate, sets a transmission power other than that requested by a control signal of the receiving station. In this way, the transmission power of the transmitting station can on average be lower than when only the received control signal is taken into account, because when the repetition rate falls below its target value, the transmission power can be reduced even if the control signal requests the opposite.

Particularly advantageously, the repetition rate of the data packets received anew by the receiving station is determined either from the total number of the data packets received within an assumed time interval and the number of data packets, which have been received for the first time or from the total number of data packets transmitted within an assumed time interval from the transmitting station and the number of data packets transmitted for the first time.

In an advantageous embodiment, the receiving station is a base station and the transmitting station is a mobile station.

In an alternate advantageous embodiment, the receiving station is a mobile station and the transmitting station is a base station.

In a preferred further development, at least one additional receiving station receives data packets from the transmitting station, the additional receiving station receives anew incorrectly received data packets from the transmitting station and the transmission power of the transmitting station is controlled depending on a repetition rate of the data packets received anew by the receiving station and the receiving stations forward their received data packets to a control station. During a transmission of data, the same data packets can be received by both receiving stations so that the repetition rate is the same for both the receiving stations. The transmission power of the transmitting station can be controlled by both receiving stations based on the repetition rate in such a way that a specific repetition rate and, with that, an overall receive quality are achieved by both the receiving stations. If the receiving stations forward the data packets to the control station, for example, a radio network controller, the data packets with the overall receive quality (e.g. a block error rate) are available in the control station.

An occupancy of transmission resources which is as low as possible can be achieved by the receiving stations only forwarding correctly received data packets to the control station.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
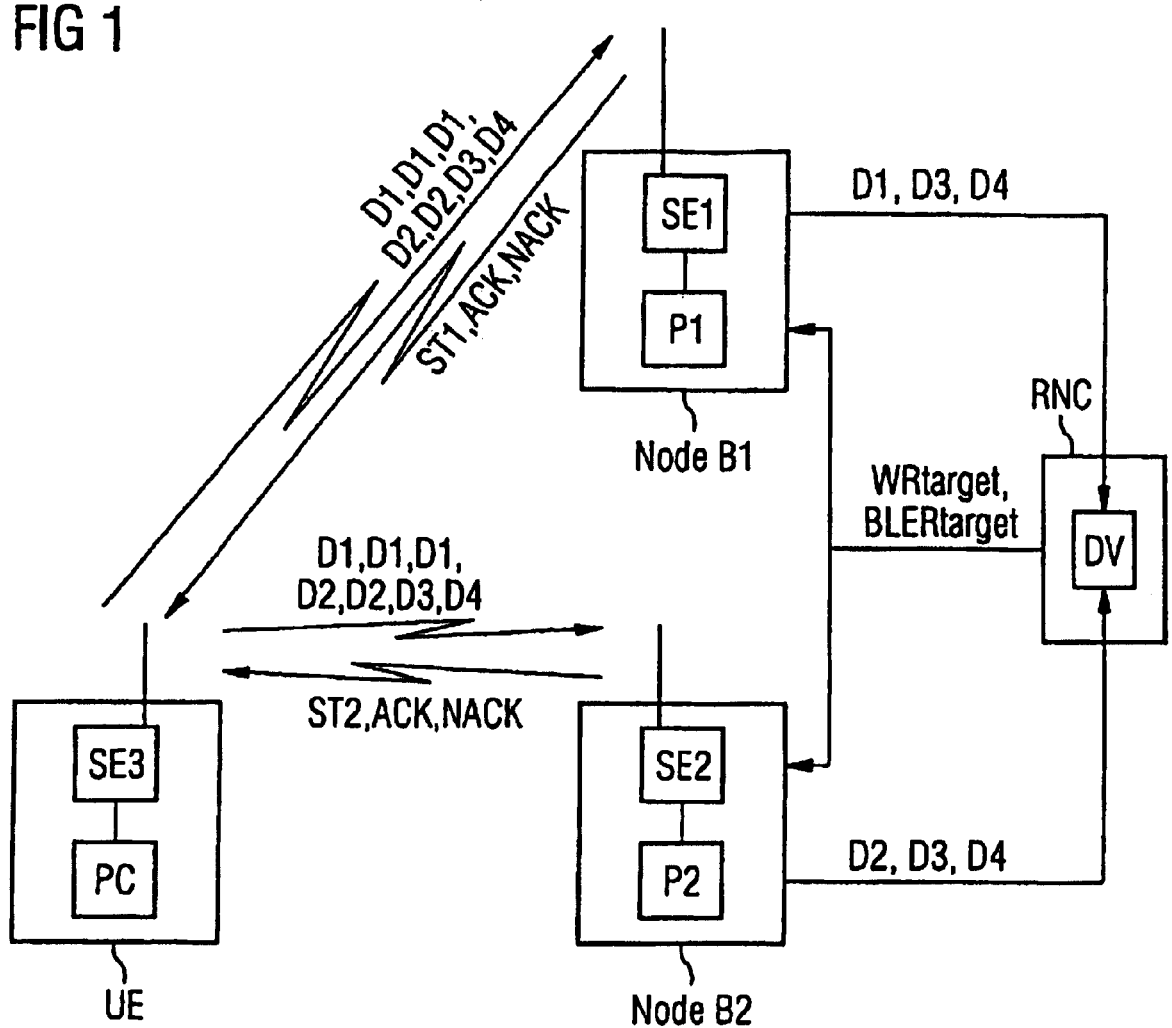
FIG. 1 a diagram of a radio communication system in accordance with one embodiment of the invention with a subscriber station, two base stations and a control station, FIG. 2 a diagrammatic representation of data packets which are transmitted by the subscriber station in accordance with FIG. 1 to the base stations, FIG. 3 a diagrammatic representation of a first control of the transmission power for the subscriber station in accordance with FIG. 1, FIG. 4 a diagrammatic representation of a second control of the transmission power for the subscriber station in accordance with FIG. 1 and FIG. 5 a diagrammatic representation of a third control of the transmission power for the subscriber station in accordance with FIG. 1.

Reference will now be made in detail to the preferred embodiments of the present invention, examples of which are illustrated in the accompanying drawings, wherein like reference numerals refer to like elements throughout.

A transmitting station is any station that can send signals. Below, a subscriber station is regarded as a transmitting station. A subscriber station is for example a mobile telephone or even a portable device for the transmission of video and/or audio data, for sending faxes, sending Short Message Services SMSs and the sending of e-mails and also for access to the Internet. It consequently concerns a general transmitter unit and/or receiver unit of a radio communication system.

Below, a base station is regarded as the receiving station, however without being limited thereto. As a matter of course, a receiving station can also be a mobile station or any other station with receives equipment for the reception of signals transmitted via a radio connection.

The method can advantageously be used in any radio communication systems. Radio communication systems mean any systems in which data can be transmitted between stations via a radio interface. The transmission of data can be both bidirectional and unidirectional. Radio communication systems are in particular any mobile radio systems for example in accordance with the GSM (Global System for Mobile Communication) or the UMTS (Universal Mobile Telecommunication System) standard. Radio communication systems also mean ad-hoc networks and future mobile radio systems for example of the fourth generation.

The method, transmitting station, receiving station and system are described below using a mobile radio system in accordance with the UMTS standard as a basis, however without being limited thereto.

FIG. 1 diagrammatically represents a transmission of data from a subscriber station UE to a first and a second base station NodeB1, NodeB2. The subscriber station UE transmits, by its transmitter and receiver unit SE3, first data packets D1, second data packets D2, third data packets D3 and fourth data packets D4 to the base stations NodeB1, NodeB2. The base stations NodeB1, NodeB2 in each case receive the data packets D1, D2, D3, D4 with a transmitter unit and a receiver unit SE1, SE2 and try to decode the data packets D1, D2, D3, D4. If the decoding succeeds, the corresponding base station NodeB1, NodeB2 sends an acknowledgement signal ACK to the subscriber station UE. The subscriber station UE acknowledges with the acknowledgement signal ACK that the corresponding data packet was received correctly, i.e. error-free and as a result transmits the next data packet. If a data packet is received incorrectly from a base station (decoded), the base station NodeB1, NodeB2 transmits a corresponding acknowledgement signal NACK by which it requests anew the transmission of the incorrect and therefore incorrectly received data packet.

It is also possible of course first of all to transmit a plurality of data packets, for example, the first four data packets D1, D2, D3, D4, before the base stations NodeB1, NodeB2 in each case transmit a corresponding acknowledgement signal ACK or a request signal NACK for each of the received data packets. This is then called transmitting the data packets in windows.

The base stations NodeB1, NodeB2 forward the data packets received error-free to a data processing unit DV of a control station RNC, for example, a radio network controller. While the first base station NodeB1 has received the first, third and fourth data packets D1, D3, D4 error-free and forwards these to the control station RNC, the second base station NodeB2 has not received any of the first three data packets D1 error-free and therefore only forwards the second, third and fourth data packet D2, D3, D4 to the data processing unit DV of the control station RNC.

The data packets D3, D4 received several times are combined in the data processing unit DV. All the correctly received data packets D1, D2, D3, D4 are evaluated based on a data packet number, arranged in the correct order and forwarded to a receiver via a core network which is not shown.

The subscriber station UE transmits the first data packet D1 three times in total to the two base stations NodeB1, NodeB2 and each time receives a request signal NACK from the second base station NodeB2. However, because the subscriber station UE after the third transmission of the first data packet D1 receives an acknowledgement signal ACK from the first base station NodeB1, it subsequently transmits the second data packet D2, although the second base station NodeB2 has still not yet received the first data packet D1 error-free.

The subscriber station UE receives acknowledgement of the error-free reception of the second data packet D2 by a corresponding acknowledgement signal ACK after the second transmission from the second base stations NodeB2. In this case, the first base station NodeB1 has not received correctly any of the second data packets D2. Already during the first transmission, both the base stations NodeB1, NodeB2 receive the third and the fourth data packets D3, D4 error-free.

In order to control the transmission power of the subscriber station UE, the base stations NodeB1, NodeB2 are notified by the control station RNC of a target value BLERtarget for an error rate of the received data packets as well as a target value WRtarget for a repetition rate of the data packets received anew from the subscriber station UE. Depending on a comparison of one or both target values with a corresponding measured quantity, the base stations NodeB1, NodeB2 in each case, by a control unit P1, P2, generate a control signal ST1, ST2 which signals an increase in or a reduction of its transmission power to the subscriber station UE. Processing and application of the control signals ST1, ST2 is carried out by a control unit PC of the subscriber station UE. The generation of the control signals ST1, ST2 is described below based on FIGS. 3 and 4.

Figure 2:
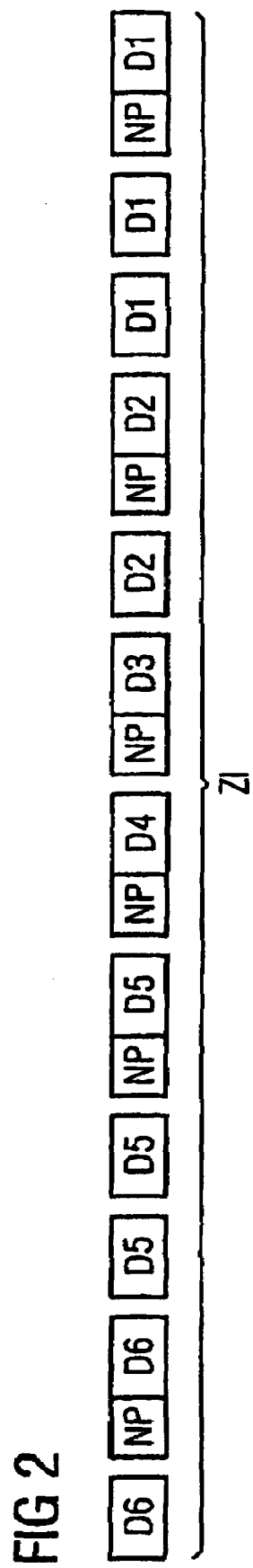

In order that the base stations NodeB1, NodeB2 can determine a repetition rate WR of the data packets received anew, the subscriber station UE, as shown diagrammatically in FIG. 2, identifies on the basis of the first four data packets D1, D2, D3, D4 as well as on the basis of an additional fifth and sixth data packet D5, D6, data packets transmitted for the first time with a corresponding identification NP.

The chronological order of the arrival of the data packets D1, D2, D3, D4, D5, D6 in the base stations NodeB1, NodeB2 is from right to left in FIG. 2.

The first data packet D1, provided with a corresponding identification NP, is then transmitted for the first time or received by the base stations NodeB1, NodeB2. Subsequently, the first data packet D1 is then transmitted anew twice. The second data packet D2 is transmitted once for the first time with the identification NP and once anew. The third and fourth data packets D3, D4 are only transmitted for the first time, i.e. with identification NP, while the fifth data packet D5 is transmitted three times. Therefore, a transmission of the fifth data packet D5 takes place with the identification NP and two additional transmissions are retransmissions and as a result have no identification NP. The sixth data packet D6 is received once for the first time with identification NP and once anew without an identification NP.

The base stations NodeB1, NodeB2, in a time interval Z1 count both the total number of data packets received, in this embodiment 12 data packets, and the number of data packets transmitted with an identification NP, here 6 data packets. The repetition rate WR is then obtained from the ratio of the number of data packets received with identification to the number of data packets received in total. Therefore, in the embodiment in FIG. 2, the repetition rate is 6/12=0.5. The repetition rate can also of course be independent of the number of data packets received in total in which the repetition rate is defined as the number of data packets with identification NP received within a time interval which can be selected.

Figure 3:
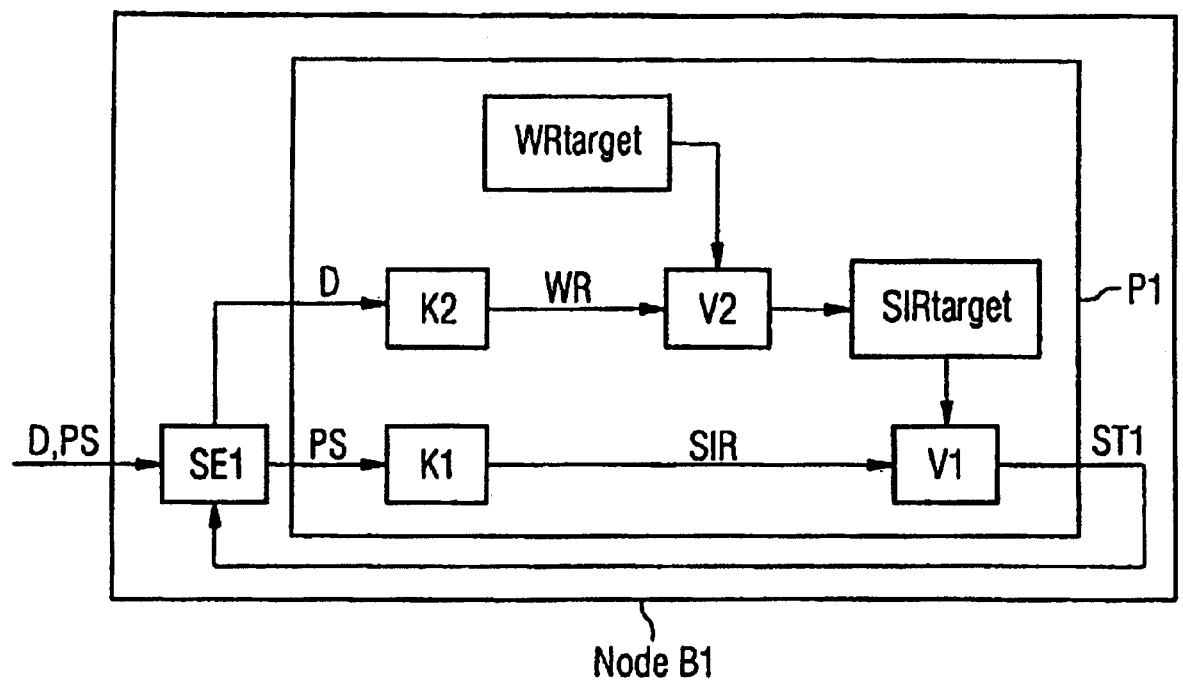

FIG. 3 diagrammatically shows a control of the transmission power of the subscriber station UE depending on the repetition rate WR by the control signals ST1, which are generated by the first base station NodeB1. Devices with the same functionality are accordingly found in the second base station NodeB2 in order to generate the control signals ST2.

The first base station NodeB1 receives by its transmitter and receiver unit SE1, control signals PS (pilot symbols) and data packets D from the subscriber station UE. In a first control unit K1, the first base station NodeB1 determines, based on the control signals PS, a receive quality SIR of the data packets D, for example, a signal-to-interference ratio. A repetition rate WR of the data packets received anew is determined in a second control unit K2 based on the received data packets D. In a second comparison unit V2, the repetition rate WR is compared with the target value WRtarget of the repetition rate. The result of the comparison serves to establish a target value SIRtarget for the receive quality of the data packets. In a first comparison unit V1, the receive quality SIR of the data packets is compared with its target value SIRtarget. If the receive quality SIR is better (higher) than the target value SIRtarget for the receive quality (SIR>SIRtarget), the comparison unit V1 generates a control signal ST1 which requests the subscriber station UE to reduce its transmission power. The control signal ST1 requests an increase if the receive quality SIR is lower than its target value SIRtarget.

If for example the repetition rate WR is lower than its target value WRtarget, this results in the fact that the transmission power of the subscriber station UE is too high and the target value SIRtarget for the receive quality is reduced. If the repetition rate WR exceeds its target value WRtarget, the transmission power of the subscriber station UE is too low and the target value SIRtarget for the receive quality is increased.

In order to set the target value SIRtarget for the receive quality, a reception rate WR of the data packets received anew is used in FIG. 3 instead of an error rate, for example, a block error rate. This has the advantage that all the base stations NodeB1, NodeB2 measure the same value because the repetition rate WR is the same for all the base stations NodeB1, NodeB2. As a result, in the data processing unit DV of the control station RNC, the quality of the transmission of data is achieved that is needed or desired without the subscriber station having to use an unnecessarily high transmission power for this purpose. The transmission power of the subscriber station UE is on average lower than in known methods for the control of the transmission power. As a result, there are fewer interferences.

Figure 4:
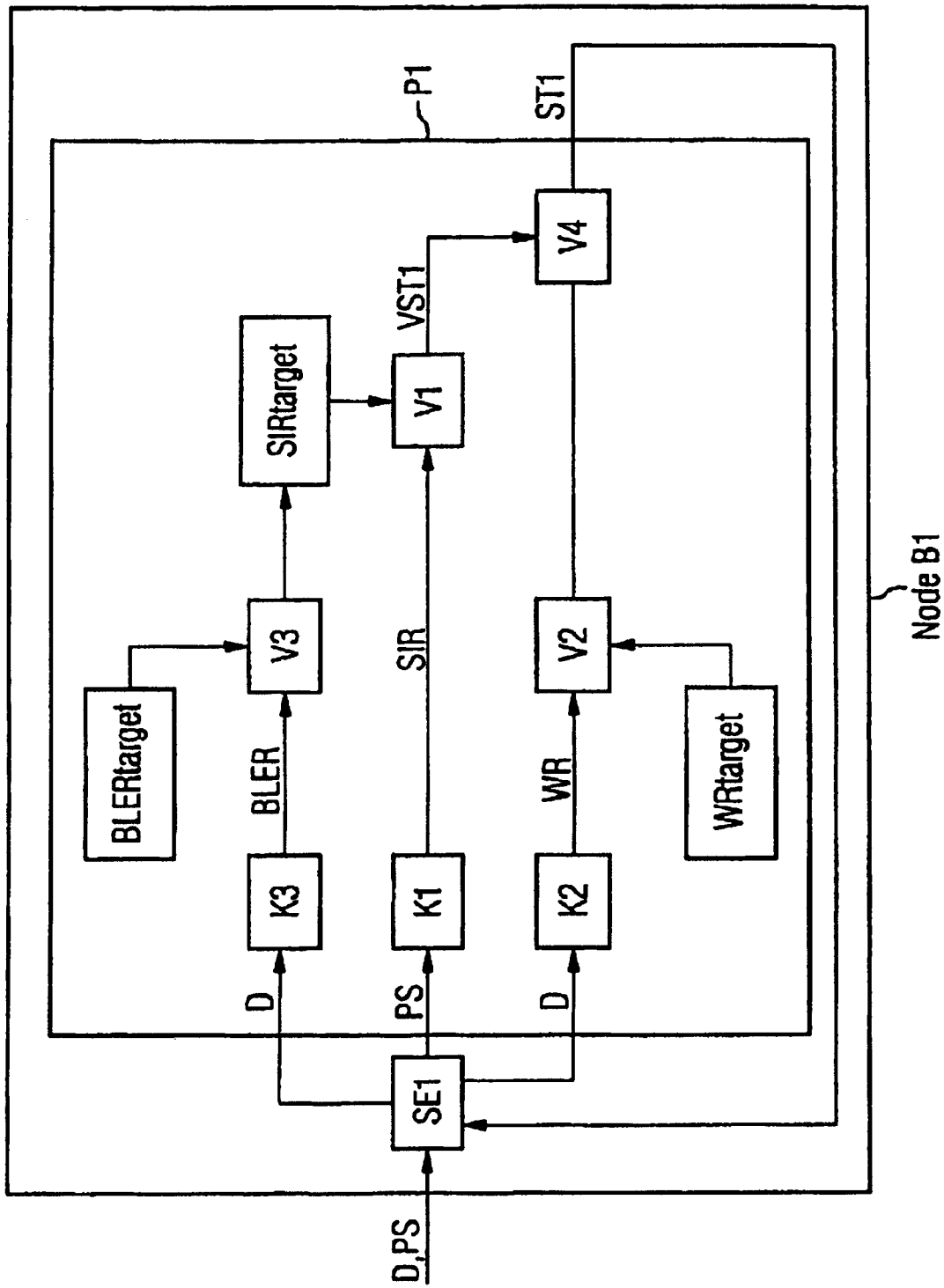

A preferred embodiment is shown diagrammatically in FIG. 4. In a known transmission power control with an inner loop and an outer loop for the control of the transmission power, the repetition rate WR of the data packets received anew is also taken into account.

The first base station NodeB1 receives by its transmitter and receiver unit SE2, control signals PS (pilot symbols) and data packets D from the subscriber station UE. In the first control unit K1, the first base station NodeB1 determines based on the control signals PS, a receive quality SIR of the data packets D, for example, a signal-to-interference ratio. In a third control unit K3, a block error rate BLER of the received data packets is determined based on the received data packets D. In a third comparison unit V3, the block error rate BLER is compared with the target value BLERtarget of the block error rate. The result of the comparison serves to establish the target value SIRtarget for the receive quality of the data packets. In the first comparison unit V1, the receive quality SIR of the data packets is compared with its target value SIRtarget. If the receive quality SIR is better than the target value SIRtarget (SIR>SIRtarget), the comparison unit generates a provisional control signal VST1 which requests the subscriber station UE to reduce its transmission power. The provisional control signal VST1 requests an increase if the receive quality SIR is lower than its target value SIRtarget.

In the second control unit K2, the repetition rate WR of the data packets received anew is determined on the basis of the received data packets D. In the second comparison unit V2, the repetition rate WR is compared with the target value WRtarget of the repetition rate. The result of the comparison serves to establish a final control signal ST1 for the control of the transmission power of the subscriber station UE.

The final control signal ST1 is obtained from the result of the comparison of the repetition rate WR and the target value WRtarget of the repetition rate as well as the provisional control signal VST1. The combination possibilities are as follows:

1) WR<WRtarget and VST1 corresponds to a reduction of the transmission power
2) WR<WRtarget and VST1 corresponds to an increase in the transmission power
3) WR>WRtarget and VST1 corresponds to a reduction of the transmission power
4) WR>WRtarget and VST1 corresponds to an increase in the transmission power In case 1) the final control signal ST1 requests a reduction of the transmission power.

In case 2) a reduction of the transmission power is obtained from the repetition rate (a lower transmission power has a higher repetition rate), so that the final control signal ST1 requests a reduction of the transmission power.

In case 3) an increase in the transmission power is obtained from the repetition rate (a higher transmission power has a lower repetition rate). Depending on the default of the radio communication system, it is now possible to favor either the result of the repetition rate, i.e. the final control signal ST1 requests an increase in the transmission power from the provisional control signal VST1 or the provisional control signal VST1, i.e. the final control signal ST1 also requests an increase in the transmission power in the same way as the provisional control signal VST1. All told, in order to keep the transmission power of the subscriber station UE as low as possible, preference is given to the last-mentioned possibility.

In case 4) the final control signal ST1 requests an increase in the transmission power.

Through the reduction of the transmission power not provided for in the previous control of the transmission power, the effect in case 2) is that the subscriber station UE transmits overall at a lower transmission power and, in this way, generates fewer interferences.

The control of the transmission power is particularly advantageous when the subscriber station UE transmits data packets at the same time to a plurality of base stations NodeB1, NodeB2. As a matter of course, the method and devices can be used both for a transmission of data from the subscriber station UE to a single base station and for a transmission of data from a base station to a single subscriber station.

Figure 5:
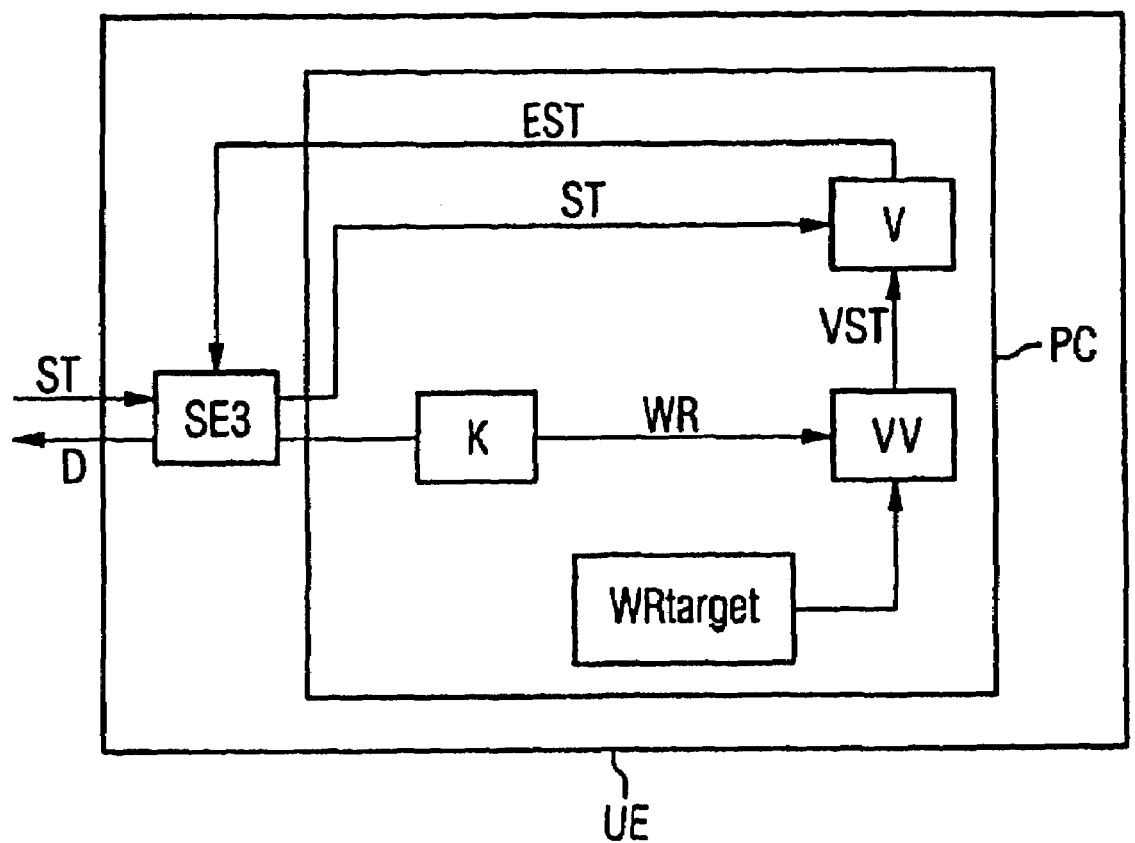

In an alternate embodiment, which is shown diagrammatically in FIG. 5, the subscriber station receives control signals ST from the base stations NodeB1, NodeB2 and transmits data packets D to the base stations NodeB1, NodeB2. The control signals ST were generated in a known way in the base stations NodeB1, NodeB2 by a customary power control in the same way, as it would for example be obtained from FIG. 4 when only using the provisional control signal VST1.

The subscriber station UE determines a repetition rate WR of the data packets transmitted anew based on the data packets D in a control unit K transmitted by said station and compares it with the target value WRtarget of the repetition rate in an additional control unit W, which generates a corresponding provisional control signal VST. In a third control unit V, a comparison with the received control signal ST is carried out and a final control signal EST is generated in accordance with the criterion, which corresponds to the criterion, described in FIG. 4 based on the cases 1) to 4). The final control signal EST serves to control the transmission power instead of the received control signal ST.

The subscriber station UE is notified of the target value WRtarget of the repetition rate by the control station RNC by using one of the base stations NodeB1, NodeB2.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method of controlling the transmission power of a transmitting station, comprising:
    receiving, at a receiving station, data packets from the transmitting station;
    receiving anew, at the receiving station, incorrectly received data packets from the transmitting station; and
    controlling the transmission power of the transmitting station based on a repetition rate of the data packets received anew by the receiving station, wherein
    the receiving station generates a provisional control signal for controlling the transmission power of the transmitting station based on the deviation of a receive quality of the data packets from a target value for the receive quality, and
    the receiving station generates a final control signal based on the repetition rate of the data packets received anew by the receiving station.

2. The method of claim 1, wherein data packets received for the first time are provided with an identification which identifies the data packets as being received for the first time.

3. The method of claim 1, wherein the repetition rate of the data packets received anew by the receiving station is determined based on the total number of data packets received within a predetermined time interval and the number of data packets that have been received for the first time within the predetermined time interval.

4. The method of claim 1, wherein the repetition rate of the data packets received anew by the receiving station is determined based on the total number of data packets transmitted within a predetermined time interval from the transmitting station and the number of data packets transmitted for the first time within the predetermined time interval.

5. The method of claim 1, wherein the receiving station is a base station and the transmitting station is a mobile station.

6. The method of claim 1, wherein the receiving station is a mobile station and the transmitting station a base station.

7. The method according to claim 1, wherein:
    at least one additional receiving station receives data packets from the transmitting station;
    the additional receiving station receives anew incorrectly received data packets from the transmitting station;
    the additional receiving station controls the transmission power of the transmitting station based on a repetition rate of the data packets received anew; and
    the two receiving stations forward their received data packets to a control station.

8. The method of claim 7, wherein the receiving stations only forward correctly received data packets to the control station.

9. A method of controlling the transmission power of a transmitting station, comprising:
    transmitting, from the transmitting station, data packets to a receiving station;
    transmitting anew, from the transmitting station, data packets incorrectly received by the receiving station; and
    controlling the transmission power of the transmitting station based on a repetition rate of the data packets transmitted anew to the receiving station, wherein
    the repetition rate is determined in the transmitting station;
    the transmitting station receives a control signal from the receiving station for controlling the transmission power; and
    the transmitting station, based on a comparison of the repetition rate with a target value of the repetition rate, sets the transmission power to a value other than that requested by the control signal of the receiving station.

10. The method of claim 9, wherein data packets transmitted for the first time are provided with an identification which identifies the data packets as being transmitted for the first time.

11. The method of claim 9, wherein the repetition rate of the data packets transmitted anew by the transmitted station is determined based on the total number of data packets transmitted within a predetermined time interval from the transmitting station and the number of data packets transmitted for the first time within the predetermined time interval.

12. The method of claim 9, wherein the receiving station is a base station and the transmitting station is a mobile station.

13. The method of claim 9, wherein the receiving station is a mobile station and the transmitting station a base station.

14. The method according to claim 9, further comprising:
    transmitting, from the transmitting station, data packets to at least one additional receiving station;
    transmitting anew, from the transmitting station, data packets incorrectly received by the additional receiving station;
    controlling the transmission power of the transmitting station based on a repetition rate of the data packets transmitted anew to both stations; and forwarding packets received at the two receiving stations to a control station.

15. The method of claim 14, wherein the receiving stations only forward correctly received data packets to the control station.

16. A transmitting station, comprising:
a unit for transmitting data packets to a receiving station;
a unit for transmitting anew data packets received incorrectly by the receiving station; and
a unit for controlling the transmission power of the transmitting station based on a repetition rate of the data packets transmitted anew to the receiving station that includes:
a unit for determining the repetition rate;
a unit for receiving a control signal from the receiving station for controlling the transmission power; and
a unit for setting, based on a comparison of the repetition rate with a target value of the repetition rate, a transmission power other than a transmission power requested via the control signal from the receiving station.

17. A radio communication system comprising a transmitting station according to claim 16.

18. A radio communication system comprising:
a receiving station comprising:
a unit for receiving data packets from a transmitting station;
a unit for receiving anew data packets received incorrectly from a transmitting station; and
a unit for controlling the transmission power of a transmitting station using a control signal; and
a transmitting station according to claim 16.

19. A receiving station, comprising:
a unit for receiving data packets from a transmitting station;
a unit for receiving anew data packets received incorrectly from the transmitting station; and
a unit for controlling the transmission power of the transmitting station based on a repetition rate of the data packets received anew from the transmitting station that includes a unit for generating a provisional control signal for controlling the transmission power of the transmitting station based on the deviation for a receive quality of the data packets from a target value for the receive quality, and
a unit for generating a final control signal depending on the repetition rate of the data packets received anew by the receiving station.

20. A radio communication system comprising a receiving station according to claim 19.

21. The radio communication system of claim 20 further comprising a second receiving station according to claim 19, wherein the receiving stations each have a unit for forwarding the received data packets to a control station.

22. A radio communication system comprising:
a transmitting station comprising:
a unit for transmitting data packets to a receiving station;
a unit for transmitting anew data packets received incorrectly by a receiving station; and
a unit for controlling the transmission power of the transmitting station based on a control signal received from a receiving station; and
a receiving station according to claim 19.

23. A radio communication system according to claim 22 comprising:
at least an additional receiving station comprising:
a unit for receiving data packets from the transmitting station;
a unit for receiving anew data packets received incorrectly from the transmitting station; and
a unit for controlling the transmission power of the transmitting station based on a repetition rate of the data packets received anew from the transmitting station; and
the receiving stations further comprise a unit for forwarding their received data packets to a control station.

* * * * *